Jan. 12, 1954    G. H. PALM    2,665,943
SPRAYER CONSTRUCTION
Filed Sept. 9, 1949    3 Sheets-Sheet 1
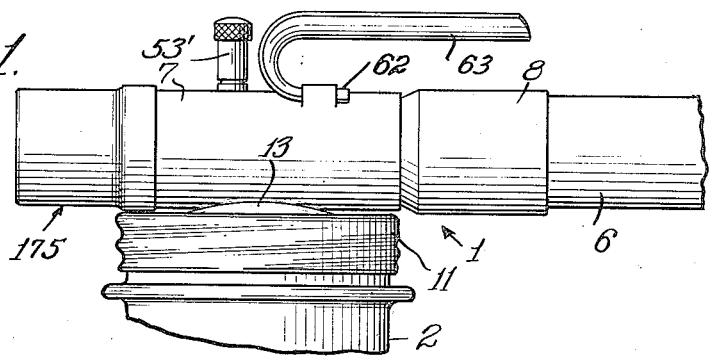
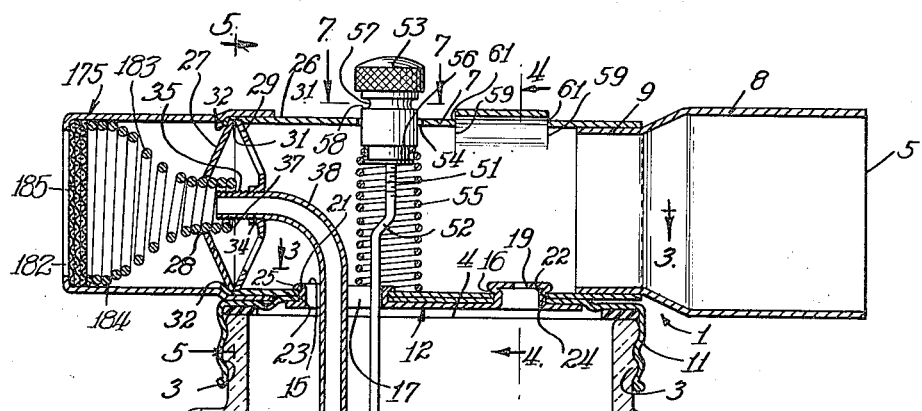
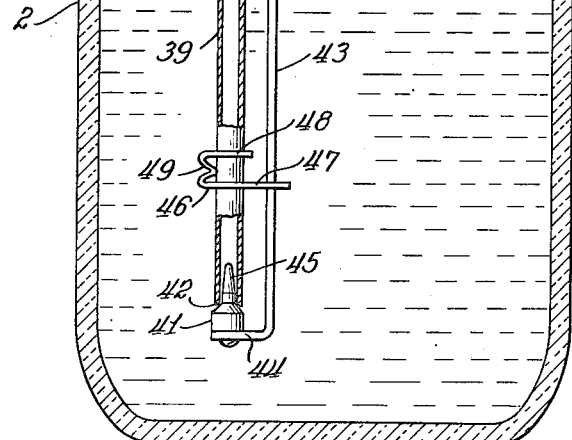
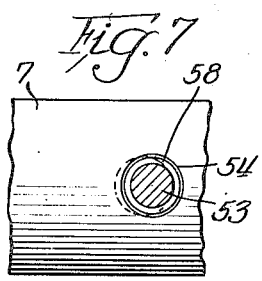
INVENTOR.
George H. Palm
BY
Lee & Lee
Att'ys.

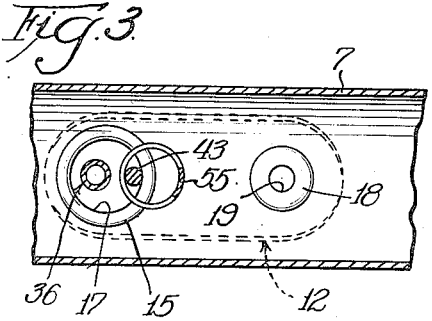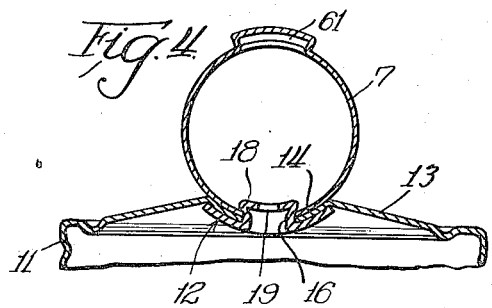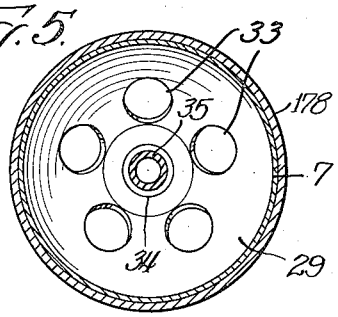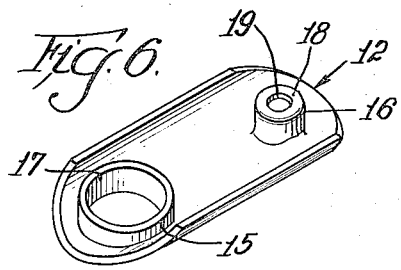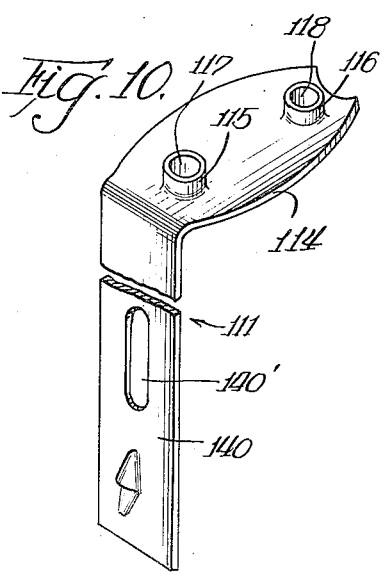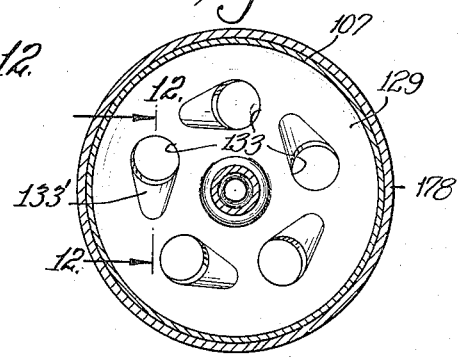

Jan. 12, 1954

G. H. PALM 2,665,943

SPRAYER CONSTRUCTION

Filed Sept. 9, 1949

INVENTOR.
George H. Palm
BY
Attys.

Patented Jan. 12, 1954

2,665,943

UNITED STATES PATENT OFFICE 2,665,943

SPRAYER CONSTRUCTION

George H. Palm, Chicago, Ill., assignor to Illinois Stamping & Mfg. Co., Chicago, Ill., a corporation of Illinois Application September 9, 1949, Serial No. 114,731

12 Claims. (Cl. 299—86)

The invention relates generally to spray guns, and more particularly to spray guns of the type which may utilize air pressure such as from a vacuum cleaner, or the like.

The invention has among its objects the production of a spray gun and foam attachment head which is relatively simple in construction, inexpensive to manufacture, and very efficient for the purposes intended.

Another object of the invention is the production of such a sprayer which is so constructed that the parts thereof may be accurately aligned and readily assembled through utilization of a minimum number of simple operations, most of the parts being adapted to be produced by stamping operations, and which may be readily adapted for use with various sized air conduits.

A further object of the invention is the production of such a sprayer which may be provided with handle means, and in which the liquid dispensing valve may be maintained in open position when desired.

A further object of the invention is the production of a novel foam creating attachment for use with liquid soap solutions, and the like, which attachment, while simple in construction, is very efficient in operation.

Many other objects and advantages of the construction herein shown and described will be obvious to those skilled in the art from the disclosure herein given.

To this end my invention consists in the novel construction, arrangement, and combination of parts herein shown and described, and more particularly pointed out in the claims.

In the drawings, wherein like reference characters indicate like or corresponding parts:

Fig. 1 is a side elevational view of a sprayer head embodying the present invention;

Fig. 2 is a vertical sectional view through the head illustrated in Fig. 1, and liquid container associated therewith;

Fig. 3 is a sectional view taken approximately on the line 3—3 of Fig. 2;

Fig. 4 is a sectional view taken approximately on the line 4—4 of Fig. 2;

Fig. 5 is a sectional view taken approximately on the line 5—5 of Fig. 2;

Fig. 6 is a perspective view of the attaching member between the head and cap;

Fig. 7 is a sectional view taken approximately on the line 7—7 of Fig. 2;

Fig. 10 is a perspective view of the mounting member for the head and cap of the construction illustrated in Fig. 9;

Fig. 11 is a sectional view taken approximately on the line 11—11 of Fig. 9; and Fig. 12 is a sectional view taken approximately on the line 12—12 of Fig. 11.

Figure 8:
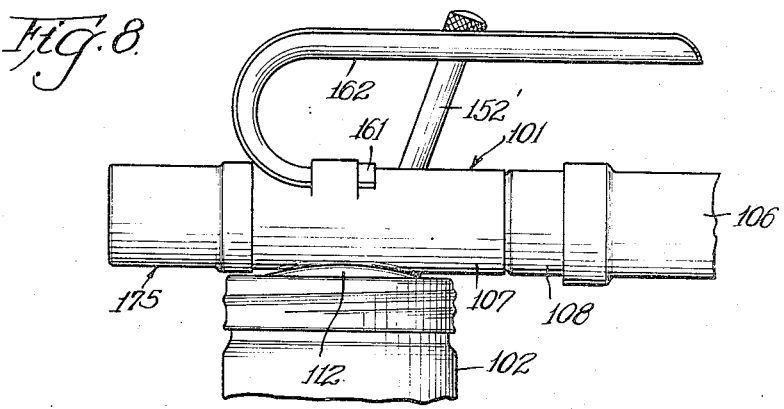
Fig. 8 is a side elevational view similar to Fig. 1 of a modified form of the invention.

Referring to the drawings, and particularly to the construction illustrated in Figs. 1 to 7, 1 indicates generally a spray gun head adapted to be mounted on a suitable container, such as the jar 2, the latter being provided with external threads 3 adjacent the mouth 4 thereof.

The sprayer head 1 is provided with an air inlet 5 at one end thereof adapted to receive the free end of a flexible tube 6, as illustrated in Fig. 1, for conducting air pressure to the sprayer head from any suitable source, as for example a vacuum cleaner, or the like. The head 1 comprises a body member 7 of generally tubular shape having a tubular sleeve 8 secured thereto at one end, with the opposite end of the sleeve forming the air inlet 5. The sleeve 8 is constructed at its inner end with an extension 9 of reduced diameter to that of the body of the sleeve, and of a size to be inserted in the adjacent end of the body 7 and retained therein by means of a press fit, or the like. A cap 11 having internal threads co-operable with the threads 3 on the container 2 is rigidly connected to the body 7 by means of a retainer member, indicated generally by the numeral 12 and illustrated in perspective in Fig. 6, the latter disclosing the shape of the member prior to its incorporation into the assembly, as illustrated in Fig. 4. The cap may be formed with a slightly coned or concavo-convex wall 13 provided with a concave depression 14 which is complementary to the curvature of the body 7 whereby the latter may seat in the depression, as shown.

The retainer member 12 connecting the cap and body is likewise of a concavo-convex cross section, the upper surface of which is substantially complementary to the inner surface of the cap at the depression 14, and is provided with a pair of upwardly extending projections 15 and 16, the projection 15 having a bore 17 therein, and the projection 16 being hollow with the upper end 18 having an aperture 19 therein. As illustrated in Fig. 2, the body 7 is provided with a pair of spaced apertures 21 and 22 respectively aligned with corresponding apertures 23 and 24 in the depression 14 of the cap 11, with the openings 21 and 23 of a size to receive the projection 15 on the member 12, and the openings 22 and 24 of a size to receive the projection 16. In assembling the body to the cap, the projections in the member 12 are positioned in their respective pairs of aligned apertures in the body and cap, following which the free end of the projection 15 is deformed to provide a locking flange 25, and the projection 16 is likewise deformed, as illustrated in Fig. 2, whereby the body and cap are firmly secured to one another with the bore 17 forming a communicating opening between the interior of the body 7 and the cap.

The opposite end 26 of the body 7 is partially closed by a more or less conical-shaped disc 27 having an axially aligned aperture 28 therein forming the air and liquid outlet of the device, and positioned within the body 7 and axially aligned with the disc 27 is a more or less conically-shaped disc 29 positioned adjacent to and in opposed relation with the disc 27. As illustrated in Fig. 2, the peripheral edges of both discs are positioned in a shallow annular channel 31 in the body 7, with the free edge of the latter flanged over the marginal edges of the disc 27, as indicated at 32, the latter being accomplished by the means of suitable forming tools. The disc 29 is provided with a plurality of radially positioned apertures 33 therein for the passage of air from the inlet 5 to the outlet 28, and is provided with an axially disposed annular flange 34 through which extends the outlet end 35 of a fluid discharge tube, indicated generally by the numeral 36. In the construction illustrated, the inner surface of the annular flange 34 is provided with threads co-operable with threads 37 on the end of the tube 36, the latter being curved adjacent the end 35, as indicated at 38, with the remaining portion 39 of the tube extended downwardly into the container 2 and terminating adjacent the bottom of the container.

Fluid flow from the container into the tube 39 may be controlled by a valve member 41 movable relative to the open end 42 of the tube to open or close the latter, the valve 41 being carried by a valve stem 43, the lower end of which is provided with a transversely extending portion 44 upon which the valve 41 is mounted. The lower end of the stem 43 is guided, in addition to the action of the tip 45 of the valve 41, by a clip or bracket 46 constructed from flat strip stock and formed in a generally U-shape having substantially parallel legs 47 and 48, the latter having aligned openings through which is inserted the tube 39, with the leg 47 extended beyond the leg 49 and having an aperture in which the stem 43 is slidably positioned. The clip 46 is initially constructed with the legs 47 and 48 separated a greater distance than that illustrated in Fig. 2 of the drawings, with the intermediate portion 49 being reversely curved slightly so that the clip may be initially mounted on the tube 39, after which pressure is applied to the legs 47 and 48, tending to move the same toward one another to deform the intermediate portion 49 until the latter engages the tube 39, whereby pressure is exerted on opposite sides of the tube to firmly clamp the clip to the tube. The opposite end of the stem 43 extends through the bore 17 in the retaining member 12 and is provided with threads 51 at its free end, the threaded portion being offset, as indicated at 52, from the body of the stem. Threaded upon the free end of the stem is an actuating knob or button 53 extending through an opening 54 in the top of the body member 7, and interposed between the bottom of the body member and the knob 53 is a compression spring 55, the upper end of the spring being contracted slightly and seated in a groove 56 adjacent the lower end of the button 53, whereby the spring is attached to the knob. The latter is provided with an annular groove 57 intermediate its ends, and as the valve stem 43 is of relatively light material and is sufficiently resilient to be moved transversely to its axis, the knob 53 may be locked in a depressed position to the body member 7 by depressing the knob and moving the same transversely to its axis to engage the shoulder 58 with the inner surface of the body adjacent the opening 54. Likewise, by rotating the knob 53 relative to the stem 43, the effective length of the latter may be varied to provide an adjustment of the valve 41, and thus control the amount of liquid entering the discharge tube 59 when the knob is fully depressed. In operation air will be discharged through the body 7 and apertures 33 in the disc 29, and out through the discharge opening 28. Likewise, air is free to enter the container 2 through the bore 17 and opening 19, thus placing the contents under pressure, and together with the reduced air pressure adjacent the end 35 of the tube 39, will result in a flow of fluid through the tube when the knob 53 is depressed.

The body 7 is provided with two transversely extending parallel cuts 59, with the portion intermediate the cuts being offset outwardly to provide a pair of aligned slots 61 in which may be positioned the end 62 of a handle member 63, as illustrated in Fig. 1, providing means for facilitating manual grasping and handling of the gun, the handle merely being frictionally engaged with the body 7, and may be eliminated if not desired. If the handle 63 is employed, the knob 53' may be substituted for the knob 53, and is substantially identical with the knob 53 with the exception that it is longer and positioned adjacent the handle for easy actuation, while the latter is manually grasped.

The embodiment of the invention illustrated in Figs. 8 to 12 in general is similar to the construction heretofore described, 101 indicating generally a spray gun head adapted to be mounted on a suitable container, such as the jar 102, the latter being provided with external threads 103 adjacent the mouth 104 thereof.

Figure 9:
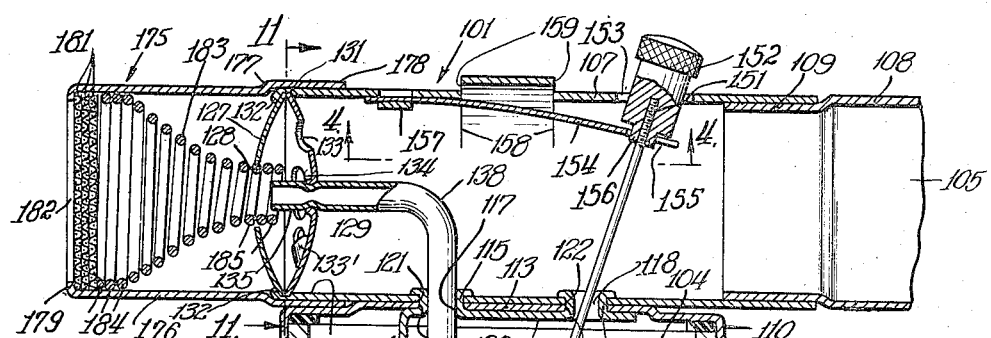
Fig. 9 is a sectional view similar to Fig. 2 of the construction illustrated in Fig. 7.

The sprayer head 101 is provided with an air inlet 105 at one end thereof adapted to receive the free end of a flexible tube 106 for conducting air pressure to the sprayer head from any suitable source, as for example a vacuum cleaner, or the like. The head 101 comprises a body member 107 of generally tubular shape having a tubular sleeve 108 secured thereto at one end, with the opposite end of the sleeve forming the air inlet 105. The sleeve 108 is constructed at its inner end with an extension 109 of reduced diameter to that of the body of the sleeve, and of a size to be inserted in the adjacent end of the body 107 and retained therein by means of a press fit, or the like. A cap 110 having internal threads co-operable with the threads 103 on the container 102 is rigidly connected to the body 107 by means of a retainer member corresponding to the member 12, indicated generally by the numeral 111 and illustrated in perspective in Fig. 10, the latter disclosing the shape of portions of the member prior to its incorporation into the assembly, as illustrated in Fig. 9. The cap may be formed with a slightly coned or concavo-convex wall 112 provided with a concave depression 113 which is complementary to the curvature of the body 107 whereby the latter may seat in the depression, as shown.

The portion 114 of retainer member 111 connecting the cap and body is likewise of a concavo-convex cross section, the upper surface of which is substantially complementary to the inner surface of the cap at the depression 113, and is provided with a pair of upwardly extending projections 115 and 116, the projection 115 having a bore 117 therein, and the projection 116 having a bore 118 therein. As illustrated in Fig. 9, the body 107 is provided with a pair of spaced apertures 121 and 122 respectively aligned with corresponding apertures 123 and 124 in the depression 113 of the cap 110, with the openings 121 and 123 of a size to receive the projection 115 on the member 111, and the openings 122 and 124 of a size to receive the projection 116. In assembling the body to the cap, the projections on the member 111 are positioned in their respective pair of aligned apertures in the body and cap, following which the free end of the projection 115 is deformed to provide a locking flange 125, and the projection 116 is likewise deformed, as illustrated in Fig. 9, whereby the body and cap are firmly secured to one another with the bore 117 forming a communicating opening between the interior of the body 107 and the cap.

The opposite end 126 of the body 107 is partially closed by a concavo-convex disc 127 having an axially aligned aperture 128 therein forming the air and liquid outlet of the device, and positioned within the body 107 and axially aligned with the disc 127 is a similarly shaped disc 129 positioned adjacent to and in opposed relation with the disc 127. As illustrated in Fig. 9, the peripheral edges of both discs are positioned in a shallow annular channel 131 in the body 107, with the free edge of the latter flanged over the marginal edges of the disc 127, as indicated at 132. As illustrated in Figs. 11 and 12, the disc 129 is provided with a plurality of radially positioned apertures 133 therein for the passage of air from the inlet 105 to the outlet 128, the material adjacent each aperture 133 being flared outwardly as indicated at 133', with the flared portion 133' similarly positioned about the axis of the disc operative to create a whirling or vortex flow of air between the discs 127 and 129 and through the outlet 128. The disc also is provided with an axially disposed annular flange 134 through which extends the outlet end 135 of a fluid discharge tube, indicated generally by the numeral 136. In the construction illustrated, the annular flange 134 is crimped around end 135 of the tube 136, the latter being curved adjacent such end, as indicated at 138, with the remaining portion 139 of the tube extended downwardly into the container 102 and terminating adjacent the bottom of the container, the end portion 139' being bent forwardly. As illustrated in Figs. 9 and 10, the retainer member 111 is provided with a downwardly extending leg 140 having an opening 140' through which extends the end portion 139' of the tube 136, whereby the latter is held in position.

Fluid flow from the container into the tube 139 may be controlled by a valve member 141 movable relative to the open end 142 of the tube to open or close the latter, the valve 141 being carried by a valve stem 143, the lower end of which is provided with a transversely extending portion 144 upon which the valve 141 is mounted. The lower end of the stem 143 is guided, in addition to the action of the tip 145 of the valve 141, by the leg 140, the latter having an opening 146 therein in which the stem 143 is slidably positioned. The opposite end of the stem 143 extends through the bore 118 in the retaining member 111 and is provided with threads 151 at its free end. Threaded upon the free end of the stem is an actuating knob or button 152 extending through an opening 153 in the top of the body member 107, and engaged at one end with knob 152 is a flat leaf spring 154, the latter having an opening 155 therein adapted to receive the cylindrical projection 156 on the knob 152. The opposite end of the spring 154 is frictionally secured to the body 107 by the offset portion 157 formed in the latter. By rotating the knob 152 relative to the stem 143, the effective length of the latter may be varied to provide an adjustment of the valve 141, and thus control the amount of liquid entering the discharge tube 139 when the knob is fully depressed. In operation air will be discharged through the body 107 and apertures 133 in the disc 129, and out through the discharge opening 128. Likewise, air is free to enter the container 102 through the bore 118, thus placing the contents under pressure, and together with the reduced air pressure adjacent the end 135 of the tube 139, will result in a flow of fluid through the tube when the knob 152 is depressed.

The body 107 is provided with two transversely extending parallel cuts 158, with the portion intermediate the cuts being offset outwardly to provide a pair of aligned slots 159 in which may be positioned the end 161 of a handle member 162, as illustrated in Fig. 8, providing means for facilitating manual grasping and handling of the gun, the handle merely being frictionally engaged with the body 107, and may be eliminated if not desired. If the handle 162 is employed, the knob 152' may be substituted for the knob 152, and is substantially identical with the knob 152 with the exception that it is longer and extends through an opening in the handle for easy actuation, while the latter is manually grasped.

Illustrated in Figs. 1, 2, 8, and 9 is a foam producing nozzle, indicated by the numeral 175, mounted on the outlet end of each of the devices illustrated, the nozzle 175 being of particular use where the liquid to be employed is a liquid soap, or the like, adapted to be utilized in the form of foam for cleaning upholstery, or other surfaces.

Referring to Figs. 2 and 9, the nozzle illustrated comprises a tubular body 176, the inlet end of which is offset, as indicated at 177, to form a mounting sleeve 178, the inner diameter of which is of a size to receive and frictionally engage the adjacent end of the sprayer body for holding the nozzle in place on the body. The opposite or outlet end of the nozzle 175 is provided with an inwardly extending peripheral flange 179 which provides a retaining seat for a plurality of woven screens 181 extending across the outlet 182 of the nozzle. Positioned in the body 176 is a generally conically-shaped member 183, the latter, in the embodiment of the invention illustrated, being constructed of spring wire suitably coiled in the desired shape, the end coils 184 of the member 183 adjacent the screens 181 being of a slightly greater diameter prior to the assembly of the member 183 in the body than the interior diameter of the body 175, so that, upon insertion, the end coils 184 must be radially contracted and therefore will frictionally engage the inner surface of the body 176 to hold the member 183 in position, as well as the screens 181. The end coils 185 of the opposite end of the member 183 are of a size to permit their insertion through the outlet 28 in the disc 27 of the construction illustrated in Fig. 2, or the outlet 128 in the disc 127 of the construction in Fig. 9, with the extreme end coil 185 substantially encircling the adjacent end of the respective fluid tubes 38 or 136, as the case may be, but spaced therefrom to provide an air passageway. The intermediate coils of the member 183 may, if desired, be spaced as illustrated.

The shape of the member 183 is such that a venturi action is produced adjacent the outlet of the fluid tube, providing very efficient action, and as the liquid and air passes through the screens 181, the liquid will be effectively dispersed and a very efficient foaming action produced so that all of the liquid will be discharged from the outlet 182 in the form of foam.

It will be noted from the above description that I have provided a spray gun which may be readily constructed by relatively simple stamping operations, and which is so designed that the operating elements are efficiently secured together, thus producing a device which is simple and inexpensive to manufacture, and very efficient and durable in use; likewise that I have provided a very simple but highly efficient nozzle for causing the liquid utilized to be discharged from the device in the form of foam.

Having thus described my invention, it is obvious that various immaterial modifications may be made in the same without departing from the spirit of my invention; hence, I do not wish to be understood as limiting myself to the exact form, construction, arrangement, and combination of parts herein shown and described or uses mentioned.

What I claim as new and desire to secure by Letters Patent is:

1. In a spray gun, a tubular sprayer body having an air inlet at one end and a discharge aperture at the other end, a closure cap for a container, and an elongated retaining member extending axially with respect to the tubular sprayer body and positioned adjacent to and complementary with the inner surface of said cap, said member having a plurality of projections providing a plurality of openings and integrally formed therewith extending through aligned openings in the body and in said cap, said projection being deformed over the adjacent inner surface of said body to firmly secure the member, cap, and body together and forming a plurality of openings connecting the body with said container.

2. In a foam creating device for sprayers, and the like, a hollow body member having an air and fluid inlet at one end thereof and an outlet opening at the opposite end thereof, an apertured screen positioned adjacent to and extending across said outlet opening, and a substantially conical-shaped coiled spring member having the portion of greatest diameter positioned adjacent said screen and frictionally engaging the inner surface of said body to retain the screen in position, and the portion of smallest diameter positioned adjacent the inlet end of the body to direct the air and fluid from the sprayer to the screen.

3. In a foam creating device for sprayers, and the like, including a sprayer head for an air and fluid outlet opening in one end thereof, a hollow body member having an air and fluid opening therein of a size to engage such end of a sprayer head and be supported thereon, and having an outlet opening at the other end, the latter having an inwardly extending peripheral flange thereon, a plurality of apertured screens positioned adjacent the inner face of said flange and operatively extending across said outlet opening, and a coiled spring member having a substantially conical shape with the coils of greatest diameter positioned adjacent said screens and frictionally engaging the body, and the coils of smallest diameter positioned adjacent the inlet end of the body and adapted to be positioned in the air and fluid outlet opening of such a sprayer head.

4. In a spray gun, a tubular sprayer body having an air inlet end and an air outlet end, a closure cap for a container, means for securing said cap and body together, a pair of circular discs positioned adjacent the air outlet end of said body and having their peripheral edges positioned adjacent one another and secured to the body, said discs each being outwardly dished in opposite directions forming a chamber, the outer disc having a centrally located air outlet aperture therein operatively connected to the chamber, the inner disc having a plurality of radially disposed openings therein whereby air is discharged through said chamber and out the outlet aperture, and a fluid conducting tube having one end position contiguous to said air outlet opening, said tube end being secured to said inner disc with the opposite end of the tube passing through said cap.

5. In a spray gun, a tubular sprayer body having an air inlet end and an air outlet end, a closure cap for a container, means for securing said cap and body together, a pair of circular discs positioned adjacent the air outlet end of said body and having their peripheral edges positioned adjacent one another and secured to the body, said discs each being outwardly dished in opposite directions, the outer disc having a centrally located air outlet aperture therein, the inner disc having a plurality of radially disposed openings therein, portions of said disc adjacent said openings being deformed to impart a whirling motion to air passing through such openings, and a fluid conducting tube having one end positioned adjacent said air outlet opening, said tube end being secured to said inner disc with the opposite end of the tube passing through said cap.

6. In a spray gun, a tubular sprayer body having an air inlet at one end and a discharge aperture at the other end, a closure cap for a container, a retainer member complementally formed to the tubular sprayer body and closure cap for securing said cap and body together, a fluid conducting tube, one end of which is positioned in said body adjacent said aperture, with the opposite end passing through said cap, an apertured disc positioned in said body and secured to the latter, and the adjacent end of said tube being connected to and supported by said apertured disc.

7. In a spray gun, a tubular sprayer body having an air inlet at one end and a discharge aperture at the other end, a closure cap for a container, said cap having a concave depression in its upper wall in which the sprayer body is seated, and an elongated retaining member extending axially with respect to the tubular sprayer body positioned adjacent to and complementary with the inner surface of said cap at said depression, said member having a hollow projection integrally formed therewith extending through aligned openings in the body and depression in said cap, said projection being deformed over the adjacent inner surface of said body to firmly secure the member, cap and body together, a fluid conducting tube, one end of which is positioned in said body adjacent said aperture, with the opposite end passing through said hollow projection, an apertured disc positioned in said body and secured to the latter, and the adjacent end of said tube being connected to and supported by said apertured disc.

8. In a spray gun, a tubular sprayer body having an air inlet at one end and a discharge aperture at the other end, a closure cap for a container, said cap having a concave depression in its upper wall in which the sprayer body is seated, a fluid conducting tube, one end of which is positioned adjacent said aperture and the other end extending through said cap, a valve for the lower end of said tube, a valve stem for actuating said valve, a retaining member positioned adjacent to and complementary with the inner surface of said cap at said depression, said member having a projection integrally formed therewith extending through aligned openings in the body and depression in said cap, said projection being deformed over the adjacent inner surface of said body to firmly secure the member, cap and body together, and a downwardly extending leg integrally formed with said member, and operatively connected to the adjacent portion of said fluid conducting tube, said valve stem being slidably connected to said leg and guided thereby.

9. In a spray gun, a tubular sprayer body having an air inlet at one end and a discharge aperture at the other end, a closure cap for a container, said cap having a concave, depressed portion in its upper wall in which the body is seated, a retainer member positioned adjacent to and complementary with the inner surface of said cap at said depression, said member having a pair of hollow projections integrally formed therewith, each of said projections extending through respectively aligned openings in the body and depression in said cap, said extensions being flanged over the adjacent inner surface of said body to firmly secure the member, body, and cap together, a downwardly extending leg carried by said member, a liquid discharge tube secured to said body and extending down through one of said hollow projections to a point below said cap, the lower portion of said tube being connected to said leg, the upper end of said discharge tube being disposed in co-axial alignment with the discharge aperture in the sprayer body, and a valve for controlling the inlet to said discharge tube, said valve having a valve stem extending through one of said hollow projections and slidably engaging a portion of said leg, an actuating knob mounted on the upper end of said valve stem and extending radially through the sprayer body, and a spring for urging said valve stem in a direction to seat said valve on the lower end of the discharge tube.

10. In a spray gun, a tubular sprayer body having an air inlet at one end and a discharge aperture at the other end, a closure cap for a container, said cap having a concave, depressed portion in its upper wall in which the body is seated, an elongated retainer member extending axially with respect to the tubular sprayer body and positioned adjacent to and complementary with the inner surface of said cap at said depression, said member having a pair of hollow projections integrally formed therewith, each of said projections extending through respectively aligned openings in the body and depression in said cap, said projections being deformed over the adjacent inner surface of said body to firmly secure the member, body, and cap together, a liquid discharge tube secured to said body and extending down through one of said hollow projections to a point below said cap, the upper end of said discharge tube being disposed in co-axial alignment with the discharge aperture in the sprayer body, and a valve for controlling the inlet to said discharge tube, said valve having a valve stem extending through one of said hollow projections, an actuating knob mounted on the upper end of said valve stem and extending radially through the sprayer body, and a spring for urging said valve stem in a direction to seat said valve on the lower end of the discharge tube.

11. In a spray gun, a tubular sprayer body having an air inlet end and in air outlet end, a closure cap for a container, said cap having a concave, depressed portion in its upper wall in which the body is seated, a retainer member positioned adjacent to and complementary with the inner surface of said cap at said depression, said member having a pair of hollow projections integrally formed therewith, each of said projections extending through respectively aligned openings in the body and depression in said cap, said extensions being deformed over the adjacent inner surface of said body to firmly secure the member, body, and cap together, a pair of opposed discs positioned at the air outlet end of said body and sealed thereto, the outermost disc having an air outlet aperture therein, the inner disc having a plurality of radially positioned openings therein, a liquid discharge tube extending through and secured to said inner disc and extending down through one of said hollow projections to a point below said cap, the upper end of said discharge tube being disposed in co-axial alignment with the discharge aperture in the sprayer body, and a valve for controlling the inlet to said discharge tube, said valve having a valve stem extending through one of said hollow projections, an actuating knob mounted on the upper end of said valve stem and extending radially through the sprayer body, and a spring for urging said valve stem in a direction to seat said valve on the lower end of the discharge tube.

12. In a spray gun, a tubular sprayer body having an air inlet end and an air outlet end, a closure cap for a container, said cap having a concave, depressed portion in its upper wall in which the body is seated, a retainer member positioned adjacent to and complementary with the inner surface of said cap at said depression, said member having a pair of hollow projections integrally formed therewith, each of said projections extending through respectively aligned openings in the body and depression in said cap, said extensions being deformed over the adjacent inner surface of said body to firmly secure the member, body, and cap together, a pair of opposed discs positioned at the air outlet end of said body and sealed thereto, the outermost disc having an air outlet aperture therein, the inner disc having a plurality of radially positioned openings therein, a liquid discharge tube extending through and secured to said inner disc and extending down through one of said hollow projections to a point below said cap, the upper end of said discharge tube being disposed in co-axial alignment with the discharge aperture in the sprayer body, and a valve for controlling the inlet to said discharge tube, said valve having a valve stem extending through one of said hollow projections, an actuating knob mounted on the upper end of said valve stem and extending radially through the sprayer body, and a flat leaf spring, one end of which is secured to said body, and the other end operatively engaging said valve stem for urging the latter in a direction to seat said valve on the lower end of the discharge tube.

GEORGE H. PALM.

References Cited in the file of this patent

UNITED STATES PATENTS

| Number | Name | Date |
|---|---|---|
| 1,787,998 | Schylander | Jan. 6, 1931 |
| 1,911,367 | Kitto | May 30, 1933 |
| 1,948,553 | Neely | Feb. 27, 1934 |
| 2,003,087 | Lynger | May 28, 1935 |
| 2,029,141 | Warner | Jan. 28, 1936 |
| 2,154,046 | Kost | Apr. 11, 1939 |
| 2,291,946 | Brown | Aug. 4, 1942 |
| 2,385,209 | Joyce | Sept. 18, 1945 |
| 2,511,420 | Thompson | June 13, 1950 |
| 2,542,775 | Jacobson | Feb. 20, 1951 |
| 2,577,024 | Lundberg | Dec. 4, 1951 |